(12) United States Patent
Mahoney

(10) Patent No.: US 7,388,165 B1
(45) Date of Patent: Jun. 17, 2008

(54) CABLE RESTRAINT AND RADIUS CONTROL APPARATUS

(75) Inventor: William G. Mahoney, Suwanee, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/611,447

(22) Filed: Dec. 15, 2006

(51) Int. Cl.
*H02G 3/18* (2006.01)

(52) U.S. Cl. .................. 174/650; 174/152 G; 16/2.1; 16/2.2

(58) Field of Classification Search .................. 174/650, 174/153 G, 152 G, 152 R, 142, 72 A, 135, 174/652, 656, 665, 668, 669; 16/2.1, 2.2; 439/274, 275, 587; 248/56
See application file for complete search history.

(56) References Cited

U.S. PATENT DOCUMENTS

| | | | | |
|---|---|---|---|---|
| 2,367,836 A | * | 1/1945 | Brown ........................... | 16/2.1 |
| 2,573,600 A | * | 10/1951 | Pruehs .................... | 174/153 G |
| 2,920,129 A | * | 1/1960 | Rapata .................... | 174/153 G |
| 3,264,677 A | * | 8/1966 | Conrad ......................... | 16/2.1 |
| 4,125,238 A | * | 11/1978 | Tanaka ........................ | 248/56 |
| 4,981,444 A | * | 1/1991 | Willmott ................ | 174/153 G |
| 5,836,048 A | * | 11/1998 | Rossman et al. .............. | 16/2.2 |
| 6,051,795 A | * | 4/2000 | Fisher et al. ............ | 174/153 G |
| 6,583,356 B2 | * | 6/2003 | Arthur et al. ............ | 174/153 G |
| 7,098,401 B1 | * | 8/2006 | Herald et al. ........... | 174/153 G |
| 7,262,372 B2 | * | 8/2007 | Ickert ..................... | 174/153 G |

* cited by examiner

Primary Examiner—Angel R Estrada

(57) ABSTRACT

A cable management apparatus includes a cable restraint adapted to provide strain relief to a cable and a radial guide adapted to provide a desired bend radius to a cable. The apparatus may have a compressible body provided with a receiving channel adapted to receive a cable in a receiving condition and to restrict movement of the cable in a restrictive condition. The radial guide may be in the form of a shoulder provided at a closed end of the channel and having a surface of predetermined bend radius. The receiving channel may be converted between a receiving condition and a restrictive condition by compression of the body when the apparatus is inserted into an opening of a support structure.

25 Claims, 3 Drawing Sheets

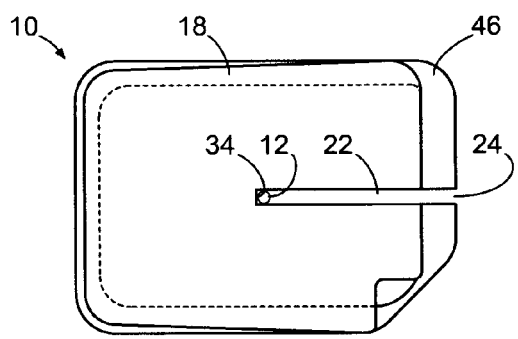 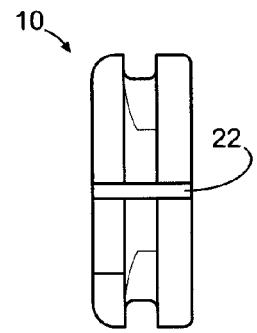
FIG. 3  FIG. 4
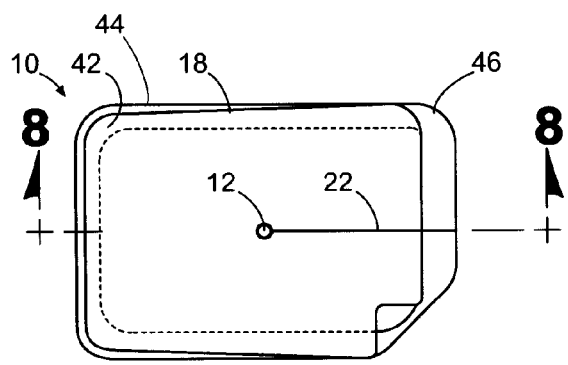 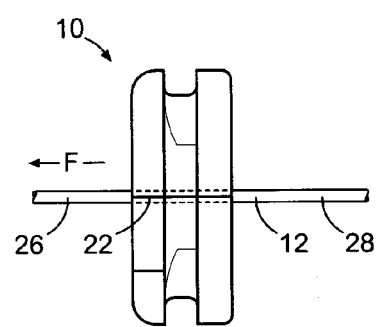
FIG. 5  FIG. 6
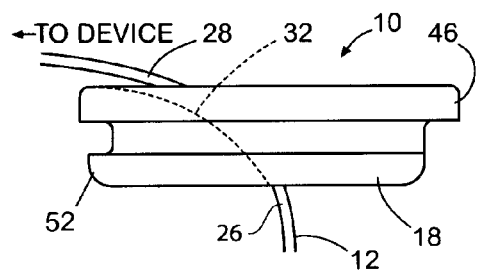 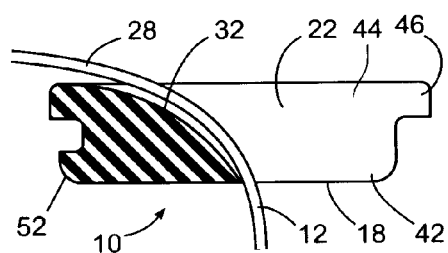
FIG. 7  FIG. 8

CABLE RESTRAINT AND RADIUS CONTROL APPARATUS

TECHNICAL FIELD

The present invention relates to cable management apparatus and systems. More particularly, the present invention relates to apparatus and systems adapted to provide cable strain relief and bend radius management.

BACKGROUND OF THE INVENTION

Proper cable management is necessary to ensure satisfactory performance of CATV systems. Because cable used in the CATV industry is sensitive to bend radius, excessive bending of the cable can lead to degraded performance, and in the case of fiber optic cable, even breakage. In addition, stresses associated with the movement of cable can damage CATV systems and degrade performance. For example, pulling forces on a cable may disconnect or damage cable connections and devices.

The importance of controlling cable movement and bend radius has only increased as more sophisticated devices which require ever tighter connection tolerances are employed in CATV systems. For example, in the case of sophisticated transmitters and receivers, such as the GS7000 from Scientific-Atlanta, the bend radius between a laser or photodiode needs to be tightly controlled to ensure good performance.

Further complicating cable management in CATV systems is the increasing use of moving parts in the vicinity of cables. For example, a CATV node, such as Scientific-Atlanta's Gainmaker® or 1 GHz node, may be enclosed in a housing having movable access trays. It is difficult to maintain a consistent bend radius and restrain cable during the opening and closing of the access trays and this movement can lead to the unintended pinching or bending of the cable which can degrade performance and/or cause permanent damage. What is needed is a means to provide for proper restraint and bend radius of CATV cable.

BRIEF DESCRIPTION OF THE DRAWINGS

FIG. 3 illustrates a front view of the cable management apparatus of FIG. 1 in a receiving condition in accordance with an exemplary embodiment of the invention.

FIG. 4 illustrates a right side view of the cable management apparatus of FIG. 1 in a receiving condition in accordance with an exemplary embodiment of the invention.

FIG. 5 illustrates a front view of the cable management apparatus of FIG. 1 in a restrictive condition in accordance with an exemplary embodiment of the invention.

FIG. 6 illustrates a right side view of the cable management apparatus of FIG. 1 in a restrictive condition in accordance with an exemplary embodiment of the invention.

FIG. 7 illustrates a top view of a cable management apparatus in accordance with an exemplary embodiment of the invention.

FIG. 8 illustrates a cutaway view along cut lines 8-8 in FIG. 5.

DETAILED DESCRIPTION

The present invention will be described more fully hereinafter with reference to the accompanying drawings in which like numerals represent like elements throughout the several figures, and in which exemplary embodiments of the invention are shown. The invention may, however, be embodied in many different forms and should not be construed as limited to the embodiments set forth herein; rather, the embodiments are provided so that this disclosure will be thorough and complete, and will fully convey the scope of the invention to those skilled in the art. The present invention is described more fully hereinbelow. While in the exemplary embodiments the invention is shown in the context of fiber optic cable, the term "cable" as used herein is not meant to be limited to fiber optic cable, but to incorporate various types of cable, such as by way of example and not limitation, fiber optic cable, coaxial cable, and similar cables.

The present invention relates to a cable management apparatus that provides both strain relief and radial guidance to a cable. In accordance with one embodiment of the invention, a cable management apparatus comprises a body having a cable restraint and a radial guide, the restraint adapted to provide strain relief to a cable extending through the apparatus and a radial guide that is adapted to provide a desired bend radius to the cable.

Figure 1:
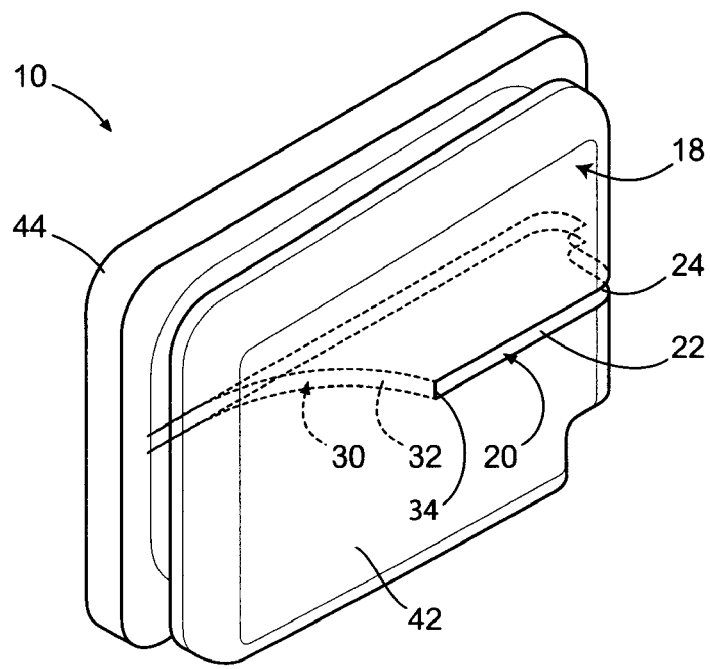
FIG. 1 illustrates a perspective view of a cable management apparatus in accordance with an exemplary embodiment of the invention.
Figure 2:
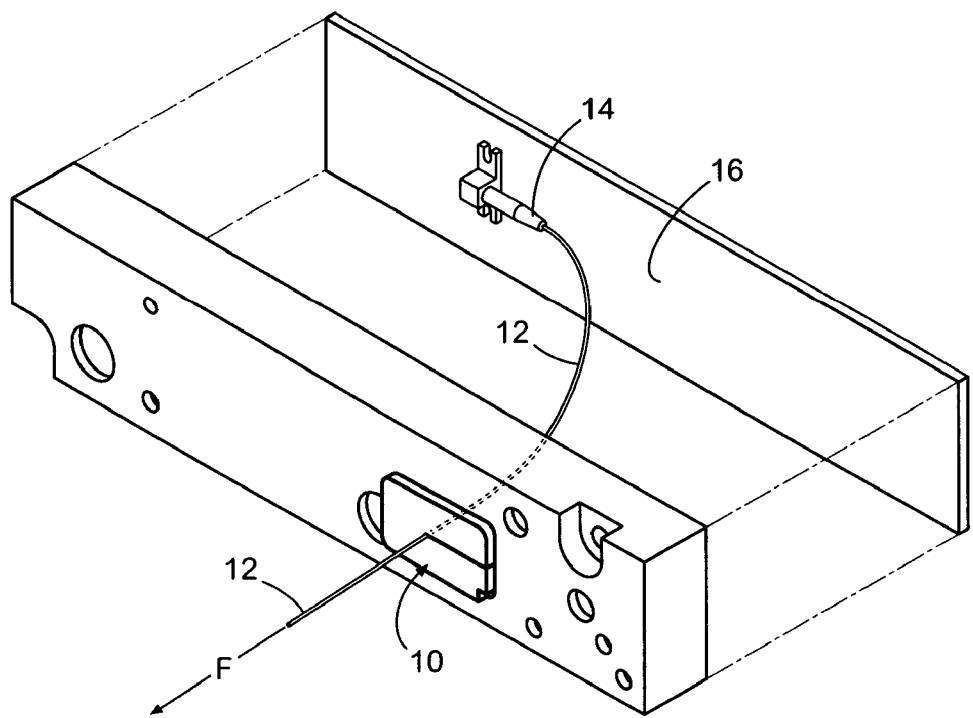
FIG. 2 illustrates a perspective view of a cable management apparatus with an associated cable in accordance with an exemplary embodiment of the invention.

Turning to the figures, FIG. 1 shows an exemplary embodiment of a cable management apparatus (CMA) 10. Turning to FIG. 2, the CMA 10 is shown in conjunction with a cable, shown as a fiber optic cable 12, having a terminus at a connector 14 with a cable device, shown as an optical interface board 16. The CMA 10 is mounted to a support structure and restrains the cable 12 to provide strain relief and prevent damage at the connector 14 when a force F is applied to the cable 12. The CMA 10 also provides a desired bend radius about the CMA 10 to prevent excessive bending of the cable 12 and ensure a proper connection between the cable 12 and the optical interface board 16.

The CMA 10 may include a body 18 having an adaptable cable restraint 20 also referred to as a strain relief. The restraint 20 may be changeable between a receiving condition adapted to receive a cable 12 and allow movement of the cable 12 through the CMA 10, and a restrictive condition adapted to restrain movement of the cable 12 through the CMA 10. In the embodiment shown in FIG. 1, the restraint 20 is in the form of a closable aperture shown as a receiving channel 22. As shown in FIGS. 3 and 4, in a receiving or open condition the receiving channel 22 is of sufficient size to receive a cable 12 therein. The channel 22 may be provided with an open end 24 to assist in the insertion of a cable 12. As shown in FIGS. 5 and 6, in a restrictive or closed condition the channel 22 is closed about the cable 12 so that the body 18 of the CMA 10 provides sufficient compressive forces to the cable 12 to restrict movement of the cable 12 through the channel 22. Preferably, the compressive forces are of a magnitude to restrain the cable 12 without damaging the cable 12.

The body 18 of the CMA 10 may be made of compressible material, such as by way of example and not limitation, silicone rubber with a durometer of about 40, and sized so that at least a portion of the body 18 may be compression fit into an aperture of a support structure. Compression and decompression of the body 18 may be used to convert the receiving channel 22 between a receiving or open condition (FIGS. 3 and 4) and a restrictive or closed condition (FIGS. 5 and 6). In the restrictive condition, the channel 22 restrains movement of the cable 12 through the CMA 10 so that a pulling force F (FIG. 6) on a portion 26 of the cable 12 on a first side of the CMA 10 is not transmitted through the CMA 10 to a portion 28 of the cable 12 on the opposite side of the CMA 10.

In addition to providing strain relief as described above, the CMA 10 may also be provided with a radial guide 30 to provide a desired bend radius to a cable 12. In the embodiments shown in FIGS. 1 and 7, a radial guide is shown in the form of a shoulder 32 provided at a closed end 34 of the receiving channel 22. The shoulder 32 may be of a shape adapted to serve as a radial guide for a cable 12 located in the receiving channel 22. In this exemplary embodiment the shoulder 32 provides a bend radius of 0.55 inches which is acceptable for most fiber optic cable. It is contemplated that a different bend radius may be used depending upon the particular application.

As shown in FIGS. 7 and 8, if the cable 12 is to extend through the CMA 10 to a connection with a device (not shown) to the left of the CMA 10, the cable 12 is prevented from bending too sharply as the cable 12 bends about the shoulder 32 to a desired bend radius. The shoulder 32 may be integral with the body 18 and take the form of a sidewall provided at a closed end 34 of the receiving channel of the body 18.

As shown in FIGS. 3-8, in use, a cable 12 may be inserted into a receiving channel 22 of a CMA 10 when the receiving channel is in a receiving condition (FIGS. 3 and 4). For example, the cable 12 may be inserted into the channel 22 through the open end 24 and moved to the closed end 34 so that the cable 12 abuts the shoulder 32. The CMA 10 may then be inserted into an aperture of a supporting structure, the CMA 10 being of a size relative to the aperture so that the body 18 of the CMA 10 is compressed upon insertion. Because the CMA 10 is made of compressible material, the receiving channel 22 is compressed to a restrictive condition (FIGS. 5 and 6) upon insertion of the CMA 10 into a suitable aperture so that compressive forces are applied to restrain the cable 12 within the CMA 10. The cable 12, being adjacent the shoulder 32, bends about the shoulder 32 (FIGS. 7 and 8) to a device (not shown) at a desired bend radius of the shoulder. Thus, the CMA 10 acts as both a strain relief and a radial guide for the cable 12.

The CMA body 18 may be shaped for fitting into an aperture of a support structure. For example, the body 18 may include a first portion 42 (FIGS. 5 and 8) having a flange 52 that is adapted for insertion through an aperture of a support structure and a second portion 44 of a larger size having a flange 46 adapted to contact the surface of the support structure surrounding the aperture. The first portion 42 of the body 18 may be inserted through an aperture of the support structure so that the flanges 46, 52 contact the support structure to assist in maintaining the CMA 10 in the aperture.

To release the cable 12 from the CMA 10 a user can simply remove the CMA 10 from the aperture. Upon removal, the body 18 decompresses so that the receiving channel 22 opens to a receiving or open condition (FIGS. 3 and 4) thereby allowing removal of the cable 12, such as by sliding the cable 12 out through the open end 24 of the channel 22.

Figure 9:
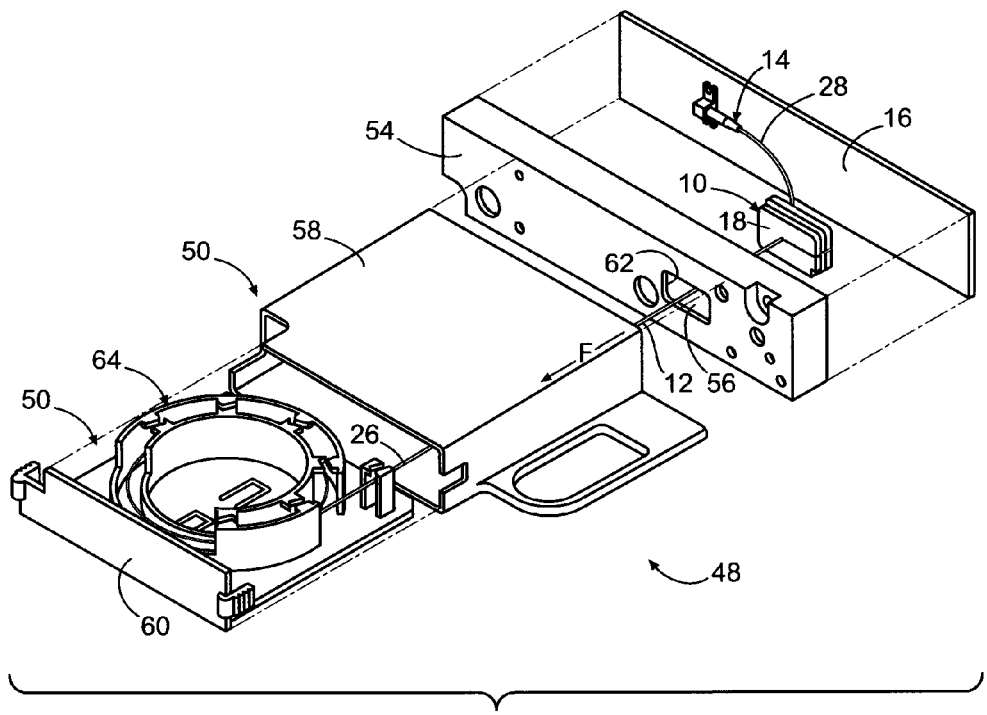
FIG. 9 illustrates an exploded perspective view of a cable management system in accordance with an exemplary embodiment of the invention.
Figure 10:
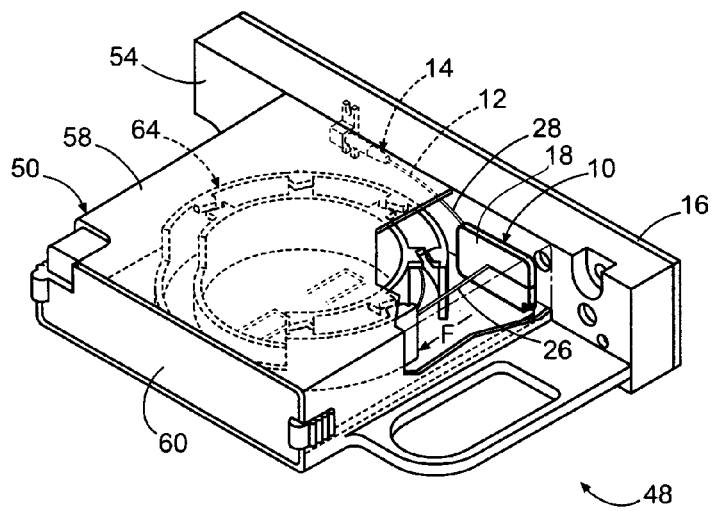
FIG. 10 illustrates a perspective view of the cable management system of FIG. 9 in accordance with an exemplary embodiment of the invention.

FIGS. 9 and 10 show a cable management system 48 of the present invention in which a CMA 10 is used in conjunction with a cable enclosure assembly 50 and an optical fiber interface board 16. To avoid obscuring the CMA 10 in FIG. 9, the system 48 is shown in an exploded view. The optical interface board 16 may be attached to a bulkhead 54 having an opening 56 for receiving a fiber optic cable 12. An enclosure assembly 50 may be mounted to the bulkhead 54, the enclosure assembly 50 having a housing 58 with a slide out access tray 60 that is adapted to hold a spool 64 of fiber optic cable 12. The cable 12 may run from the spool 64 through the opening 56 of the bulkhead 54 to a connector 14 on the optical fiber board 16 so that the cable bends from the opening 56 to the connector 14.

To prevent damage to the cable 12 from the sharp edges 62 of the aperture 56 and to provide strain relief and a desired bend radius to the cable 12, the cable 12 may be placed in the receiving channel 22 of the CMA 10 as shown in FIG. 9 and the CMA 10 then inserted into the aperture 56 as shown in FIG. 10.

As seen in FIGS. 9 and 10, the tray 60 may be moved between an open position (FIG. 9) and a closed position (FIG. 10) and the CMA 10 provides a desired bend radius to the fiber optic cable 12 as the cable 12 bends about the shoulder 32 (FIG. 1) as discussed above. When the tray 60 is pulled out from the housing 58 to an open position, the movement pulls on a first portion 26 of the fiber optic cable 12 as shown by force F (FIG. 10). Compressive forces from the body 18 of the CMA 10 restrain movement of the fiber optic cable 12 at the CMA 10 so that the CMA 10 acts as a strain relief so that a portion 28 of the fiber optic cable that extends between the CMA 10 and the connector 14 is not impacted by the pulling force F. A desired bend radius of the cable 12 is maintained throughout the movement of the tray 60 by the shoulder 32 (FIG. 1) which acts as a radial guide for the cable 12. The CMA 10 also protects the cable 12 from contact with the metal edges 62 (FIG. 9) of the opening 56 in the bulkhead 54 to prevent chafing of the cable 12.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A cable management apparatus, comprising:
   a body;
   a restraint provided within the body, the restraint adapted to restrain a cable extending through the restraint;
   a radial guide provided within the body, said radial guide adapted to provide a desired bend radius to the cable as the cable abuts said radial guide through said body, so that said cable is curved within said body; and
   an aperture having a first portion extending from a sidewall to said radial guide, and a second portion extending completely through said body from a front portion of said body to a rear portion of said body.

2. The cable management apparatus of claim 1, wherein said restraint is adapted to change between a receiving condition and a restrictive condition.

3. The cable management apparatus of claim 1, wherein said restraint comprises a channel portion of said aperture.

4. The cable management apparatus of claim 3, wherein said body is adapted to compress said channel portion upon insertion of the body into an opening of a support structure.

5. The cable management apparatus of claim 1, wherein said radial guide comprises a shoulder provided in the body.

6. The cable management apparatus of claim 1, wherein said restraint comprises a compressible channel portion of said aperture and said radial guide comprises a shoulder provided at said compressible channel portion of said aperture.

7. The cable management apparatus of claim 1, wherein said restraint comprises a channel having an open end and a closed end.

8. The cable management apparatus of claim 1, wherein said restraint comprises a channel having an open end and a closed end and said radial guide comprises a shoulder provided at said closed end.

9. The cable management apparatus of claim 7, wherein said body is compressible to compress the channel to a restrictive condition.

10. The cable management apparatus of claim 9, wherein said body has a durometer of about 40.

11. The cable management apparatus of claim 1, wherein said radial guide has a bend radius of about 0.55 inches.

12. The cable management apparatus of claim 1, wherein said body further comprises a flange adapted to engage a support structure into which the body is inserted.

13. The cable management apparatus of claim 1, wherein said radial guide is integral with said body.

14. A cable management apparatus, comprising:
a compressible body having an aperture adapted to receive and restrain a cable;
a shoulder provided at the aperture, said shoulder adapted to provide a desired bend radius to the cable received in the aperture; and
wherein said aperture has a first portion extending from a sidewall to said shoulder, and a second portion extending completely through said body from a front portion of said body to a rear portion of said body.

15. The cable management apparatus of claim 14, wherein said aperture is adapted to change between a receiving condition and a restrictive condition.

16. The cable management apparatus of claim 14, wherein said aperture comprises a channel having an open end and a closed end.

17. The cable management apparatus of claim 14, wherein said body is adapted to compress about said cable upon insertion of said body into an aperture of a support structure.

18. A method of managing cable, comprising:
inserting a cable into a cable management apparatus through an aperture having a first portion extending from a sidewall to a radial guide and a second portion extending from a front portion to a rear portion of said apparatus;
restraining said cable in said cable management apparatus; and
bending said cable to a desired bend radius about the radial guide of said cable management apparatus.

19. The method of claim 18 wherein said step of restraining said cable in said cable management apparatus comprises compressing a body of said cable management apparatus about said cable.

20. The method of claim 18 wherein said step of bending said cable to a desired bend radius about a radial guide of said cable management apparatus comprises bending said cable about a shoulder provided in a body of said cable management apparatus.

21. A cable management system, comprising:
a cable enclosure having a movable drawer, said drawer adapted for holding a spool of cable; and
a cable management apparatus adapted to receive said cable from said cable enclosure, said cable management apparatus comprising:
a radial guide adapted to provide a desired bend radius to said cable;
an aperture having a first portion extending from a sidewall to said radial guide and a second portion extending through the apparatus from a front portion of said apparatus to a rear portion of said apparatus; and
a cable restraint adapted to restrain movement of said cable.

22. The cable management system of claim 21, wherein said cable management apparatus is adapted for mounting within a support structure.

23. The cable management system of claim 21, wherein said cable restraint comprises a compressible channel portion of said aperture.

24. The cable management system of claim 23, wherein said radial guide comprises a shoulder provided at a closed end of said compressible channel portion.

25. A cable management apparatus comprising:
a compressible body;
a radial guide within said body;
an aperture having a first portion extending through said body from a front portion of said body to a rear portion of said body, and a channel portion extending from a sidewall of said body to said radial guide; and
wherein said channel portion restrains a cable extending through said body when said channel portion is closed by compression of said body.

* * * * *